US012382213B2

(12) United States Patent
Je et al.

(10) Patent No.: US 12,382,213 B2
(45) Date of Patent: Aug. 5, 2025

(54) FLEXTENSIONAL LOW FREQUENCY SOUND PROJECTOR

(71) Applicant: AGENCY FOR DEFENSE DEVELOPMENT, Daejeon (KR)

(72) Inventors: Yub Je, Daejeon (KR); Soo-Hyun Lim, Daejeon (KR); Yo-Han Cho, Daejeon (KR); Jeong-Min Lee, Daejeon (KR); Hee-Seon Seo, Daejeon (KR)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 246 days.

(21) Appl. No.: 18/212,917

(22) Filed: Jun. 22, 2023

(65) Prior Publication Data

US 2024/0056726 A1 Feb. 15, 2024

(30) Foreign Application Priority Data

Aug. 12, 2022 (KR) ...................... 10- 2022-0101371

(51) Int. Cl.
*H04R 17/00* (2006.01)
*H04R 1/28* (2006.01)
*H04R 17/10* (2006.01)

(52) U.S. Cl.
CPC ........... *H04R 1/2811* (2013.01); *H04R 17/10* (2013.01)

(58) Field of Classification Search
CPC ...... H04R 17/00; H04R 17/005; H04R 17/10; H04R 2217/00; H04R 2217/01;
(Continued)

(56) References Cited

U.S. PATENT DOCUMENTS 4,922,470 A * 5/1990 McMahon ............. G10K 9/121 367/174
5,136,556 A * 8/1992 Obara .................... G10K 9/121 367/163
(Continued)

FOREIGN PATENT DOCUMENTS

JP 4123703 B2 7/2008
KR 10-2011-0088039 A 8/2011
(Continued)

OTHER PUBLICATIONS

Yub Je et al., "A research on the broadband flextensional transducer with double vibration mode", Korea Institute of Military Science and Technology Journal, ISSN 2636-0659, 2022, p. 581~582.

*Primary Examiner* — Ryan Robinson
(74) *Attorney, Agent, or Firm* — LRK PATENT LAW FIRM

(57) ABSTRACT

Proposed is a flextensional low-frequency sound projector including a piezoelectric actuator including a piezoelectric stack formed by stacking piezoelectric element and generating vibration in a lengthwise direction in response to an electrical signal that is input, and a stave mounted on the piezoelectric actuator in such a manner as to encompass an outer surface of the piezoelectric actuator and generating the vibration in the lengthwise direction, which is generated by the piezoelectric actuator, as vibration in a lateral direction perpendicular to the outer surface of the piezoelectric actuator, wherein the stave activates two vibration modes that use different resonance frequencies. The flextensional low-frequency sound projector that utilizes two vibration modes results from improving an existing flextensional low-frequency sound projector that is driven in a single vibration mode and thus has a narrow frequency bandwidth.

10 Claims, 3 Drawing Sheets

(58) Field of Classification Search
CPC ...... B06B 1/0633; G10K 9/121; G10K 9/122; G10K 9/125
See application file for complete search history.

(56) References Cited

U.S. PATENT DOCUMENTS

| | | | | |
|---|---|---|---|---|
| 6,535,459 | B1 * | 3/2003 | Hutton | G10K 9/121 367/174 |
| 6,545,949 | B1 * | 4/2003 | Franklin | H04R 17/00 367/176 |
| 6,567,343 | B1 | 5/2003 | Purcell et al. | |
| 7,457,199 | B2 * | 11/2008 | Purcell | G10K 9/121 367/163 |
| 8,565,043 | B2 * | 10/2013 | Hama | H04R 17/00 367/174 |
| 10,916,233 | B2 * | 2/2021 | Bond | H04R 31/003 |
| 11,417,305 | B2 * | 8/2022 | Brogan | H04R 1/44 |

FOREIGN PATENT DOCUMENTS

| | | | | |
|---|---|---|---|---|
| KR | 10-2022-0071447 | A | 5/2022 | |
| WO | WO-2011035745 | A2 * | 3/2011 | B06B 1/0655 |
| WO | 2019/165132 | A1 | 8/2019 | |

* cited by examiner

FLEXTENSIONAL LOW FREQUENCY SOUND PROJECTOR

CROSS REFERENCE TO RELATED APPLICATION

The present application claims priority to Korean Patent Application No. 10-2022-0101371, filed Aug. 12, 2022, the entire contents of which is incorporated herein for all purposes by this reference.

BACKGROUND OF THE INVENTION

Field of the Invention

The present disclosure relates to a low-frequency sound transmission projector and, particularly, to a low-frequency sound projector that utilizes a flextensional mode.

Description of the Related Art

Sound transducers that transmit and receive a sound wave have been utilized sound navigation and ranging (SONAR) for locating underwater objects, a probe for non-destruction testing, a medical ultrasound probe, and the like. The sound transducers may be utilized as projectors dedicated transmission. Particularly, low-frequency sound projectors are capable of generating a low-frequency sound wave with a low attenuation effect and thus may be used in SONAR equipment for detecting an underwater long-distance target object and for underwater communication.

The important object of research in the field of a low-frequency projector is to design a projector in such a manner as to have mechanical resonance at a driving frequency band. Usually, in order to produce the mechanical resonance in the projector, the projector has to be designed in such a manner that a size thereof is close to the wavelength at the driving frequency. Thus, relatively a large-sized projector for driving at a low-frequency having a long wavelength is required.

A Tonpilz projector, a free flooded ring (FFR) projector, a flextensional projector, and the like have been used as sound projects for low-frequency driving.

The Tonpilz projector is a projector in which a sound wave is generated by fastening a weight to both ends of a piezoelectric element using a bolt.

The ring projector is a projector which the sound wave is generated, by a ring-type piezoelectric element, in a lateral direction of a ring. A ring is filled with water, and thus the low-frequency driving is possible by utilizing an internal cavity mode.

The flextensional projector generates a sound wave by converting vibration generated by a piezoelectric actuator in a lengthwise direction thereof into vibration in a lateral direction of a stave. The vibration in the lateral direction is generated by utilizing a plate-bending mode. Accordingly, there is provided an advantage in that the low-frequency driving is possible with a small-sized projector. The flextensional projectors are categorized according to the shape of the stave (flat, concave, and convex shapes). Various types of flextensional projectors may be used according to the purpose.

However, a flextensional transducer utilizes a single resonance mode of the stave. Therefore, there is a limitation in that the flextensional transducer is driven only in a narrow frequency band. There is also a problem in that characteristics change with a change in water pressure that varies with water depth.

The matters described above are intended to help an understanding of the background of the present disclosure and may include matters that, although not referred to as the related art, are known to a person of ordinary skill in the art to which the present disclosure pertains.

SUMMARY OF THE INVENTION

An object of the present disclosure, which is contrived to solve the above-mentioned problem, is to provide a low-frequency broadband flextensional projector that has a stave structure that utilizes two vibration modes and thus has a wide frequency bandwidth. The low-frequency broadband flextensional projector results from improving an existing flextensional low-frequency sound projector that is driven in a single vibration mode and thus has a narrow frequency bandwidth.

According to an aspect of the present disclosure, there is provided a flextensional low-frequency sound projector including: a piezoelectric actuator including a piezoelectric stack formed by stacking piezoelectric element and generating vibration in a lengthwise direction in response to an electrical signal that is input, and a pair of weighted objects that are brought into surface contact with both ends, respectively, of the piezoelectric stack; and a stave mounted on the piezoelectric actuator in such a manner as to encompass an outer surface of the piezoelectric actuator and generating the vibration in the lengthwise direction, which is generated by the piezoelectric actuator, as vibration in a lateral direction perpendicular to the outer surface of the piezoelectric actuator, wherein the stave activates two vibration modes that use different resonant frequencies.

In the flextensional low-frequency sound projector, the stave may include a flextensional bar mounted on the outer surfaces of the weighted objects; and bending bars being continuous with both ends, respectively, of the flextensional bar.

In the flextensional low-frequency sound projector, a plurality of the flextensional bars may be arranged to be spaced away along a circumference of the piezoelectric stack, and a plurality of the bending bars may be arranged to be spaced apart along the circumference of the piezoelectric actuator.

In the flextensional low-frequency sound projector, the flextensional bar may be shaped in a manner that is bent in a width direction thereof.

In the flextensional low-frequency sound projector, an upper surface of the flextensional bar may be shaped in a manner that is bent in a lengthwise direction thereof.

In the flextensional low-frequency sound projector, the upper surface of the flextensional bar may be concavely shaped.

The flextensional low-frequency sound projector may further include an insulating plate brought into surface contact with the weighted object and interposed between the piezoelectric stack and the weighted object.

In the flextensional low-frequency sound projector, both ends of the flextensional bar may be brought into contact with the weighted objects, respectively, that constitute one pair, and a lower surface of one end portion of the bending bar may be brought into surface contact with a lateral surface of the weighted object.

The flextensional low-frequency sound projector may further include a baffle configured in such a manner that one surface thereof is brought into contact with the weighted object and that a lateral surface thereof is brought into contact with an inner surface of the bending bar; and an acoustic window having an inner surface whose shape corresponds to the shape of an outer surface of the stave and surrounding the stave.

DETAILED DESCRIPTION OF THE INVENTION

In order to get a full understanding of the present disclosure, operational advantages thereof, and the object thereof that is accomplished by a desired embodiment thereof, reference should be made to the accompanying drawings in which the desired embodiment thereof is illustrated and the contents of the drawings.

A well-known technology associated with the desired embodiment of the present disclosure, when it makes the nature and gist of the present disclosure unnecessarily obfuscated, is briefly mentioned, and a description of a constituent element according to the present disclosure is not redundantly repeated.

Figure 1:
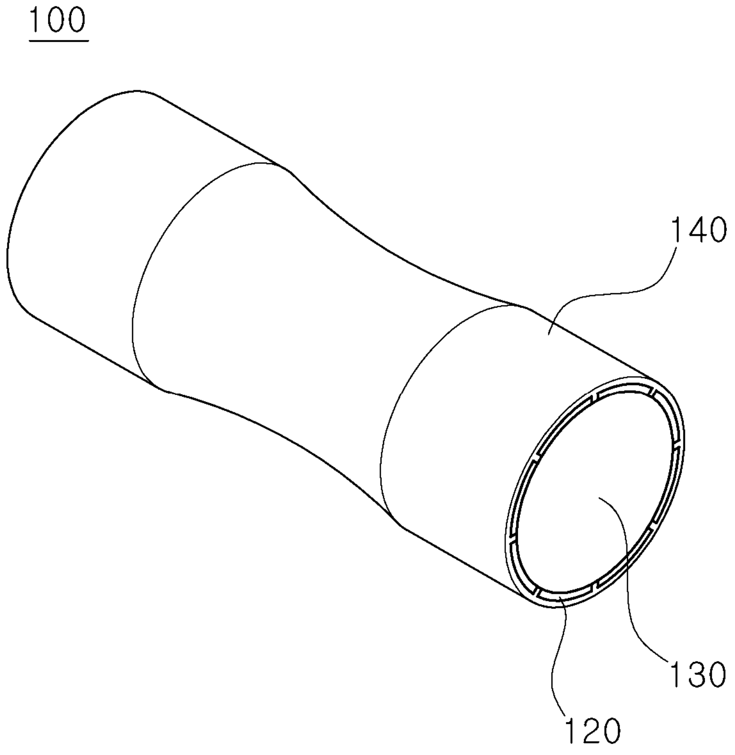
FIG. 1 is a view illustrating an exterior appearance of a flextensional low-frequency sound projector according to the present disclosure.
Figure 2:
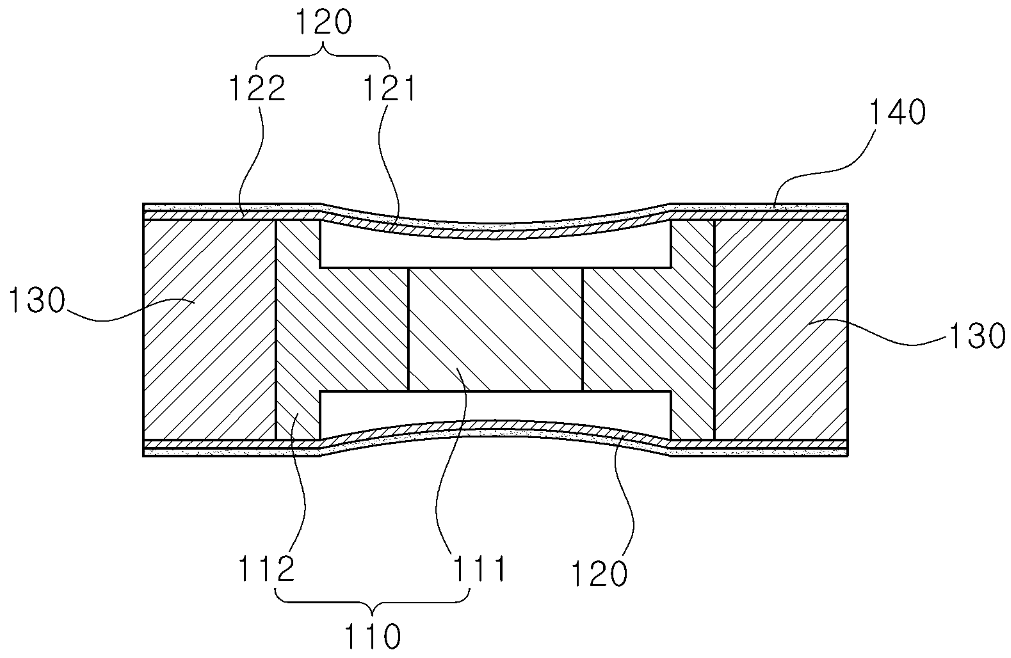
FIG. 2 is a vertical cross-sectional view illustrating the flextensional low-frequency sound projector according to the present disclosure.

FIG. 1 is a view illustrating an exterior appearance of a flextensional low-frequency sound projector according to the present disclosure. FIG. 2 is a vertical cross-sectional view illustrating the flextensional low-frequency sound projector according to the present disclosure.

The flextensional low-frequency sound projector according to the present disclosure will be described below with reference to FIGS. 1 and 2.

The flextensional low-frequency sound projector according to the present disclosure includes a piezoelectric actuator 110, a stave 120, a baffle 130, an acoustic window 140 and transmits low-frequency sound through the piezoelectric actuator 110 using the stave 120. The flextensional low-frequency sound projector according to the present disclosure is capable of activating two vibration modes instead of a single vibration mode and thus transmitting the low-frequency sound in a broad frequency band.

The piezoelectric actuator 110 vibrates along a lengthwise direction of the flextensional low-frequency sound projector. The stave 120 radiates a sound wave by converting the vibration in the lengthwise direction of the piezoelectric actuator 110, generated by the piezoelectric actuator 110, into vibration in a lateral direction perpendicular to the lengthwise direction and in a radial direction.

Figure 3:
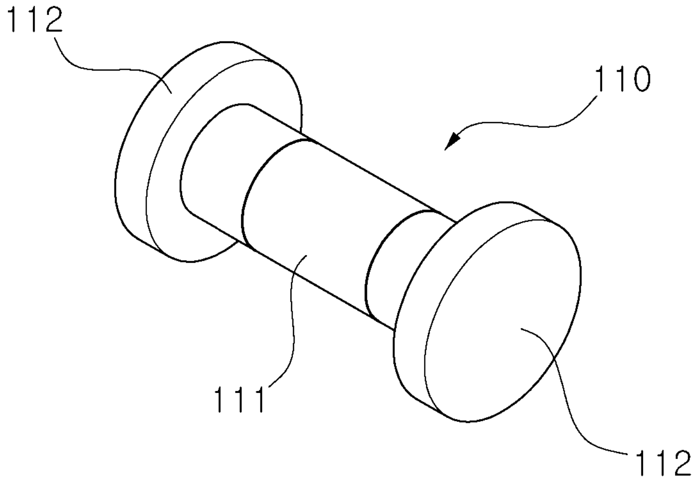
FIG. 3 is a view illustrating a piezoelectric actuator that constitutes the flextensional low-frequency sound projector according to the present disclosure.

The piezoelectric actuator 110 illustrated in FIG. 3 generates the vibration in the lengthwise direction of the flextensional low-frequency sound projector in response to an electric signal that is input. The piezoelectric actuator 110 is configured to include a piezoelectric stack 111 that converts an electrical signal into a mechanical vibration and a pair of weighted objects 112 that are coupled to both ends, respectively, of the piezoelectric stack 111.

The piezoelectric stack 111 may have a structure in which piezoelectric elements in the shape of a circular, a rectangular, or polyhedral ring are stacked on top of each other. As illustrated, the piezoelectric stack 111 may have the shape of a cylinder. It is desired that the weighted object 112 has a greater outer diameter than the piezoelectric stack 111. An electrode plate for applying the electrical signal may be inserted between each of the piezoelectric elements, or an electrode surface may be deposited between each of the piezoelectric elements.

The piezoelectric element may contain any one of PZ 1 $[Pb(Zr/Ti)O_3]$, PMN-PT$[Pb(Mg_2/3Nb_{1/3})O_3—PbTiO_3]$, PIN-PMN-PT$[Pb(In_{1/2}Nb_{1/2})O_3—Pb(Mg_{2/3}Nb_{1/3})O_3—PbTiO_3]$, PIN-PMN-PT Mn doped, and PMN-PZT$[Pb(Mg_{2/3}Nb_{1/3})O_3—PbZrO_3—PbTiO_3]$ that enable the electrical signal to be converted into a mechanical vibration.

In addition, the piezoelectric stack 111 may have insulating plates on both end portions thereof in order to insulate a high-voltage electrical signal that is applied to an electrode from a structure. The insulating plate may be arranged in such a manner as to be brought into surface contact with the weighted object 112 and may have the same ring shape as the piezoelectric stack 111. The insulating plate may be formed of an insulating material GRP, such as ceramics, glass, or engineering plastic.

The weighted objects 112 are brought into surface contact with both ends, respectively, of the piezoelectric stack 111. The stave 120 described below is attached to a lateral surface of the weighted object 112.

The weighted object 112 may have the shape of a circular, rectangular, or polyhedral ring in such a manner that the stave 120 described below is attached thereto. A thickness and diameter of the weighted object 112 may be determined by considering a vibration characteristic of the stave 120. The weighted object 112 may be formed of a material, such as iron, aluminum, tungsten, brass, or engineering plastic.

A tension bolt may be used on the weighted object 112 in order to fix the piezoelectric stack 111 and the weighted objects 112 in a state where the weighted objects 112 are attached to both ends, respectively, of the piezoelectric stack 111 and to apply compression total stress to the piezoelectric element. With the application of total compressive stress, the piezoelectric element vulnerable to tension may be driven in a manner that produces a high output. The tension bolt may be formed of a metal material with high strength, such as iron, aluminum, or tungsten.

Figure 4:
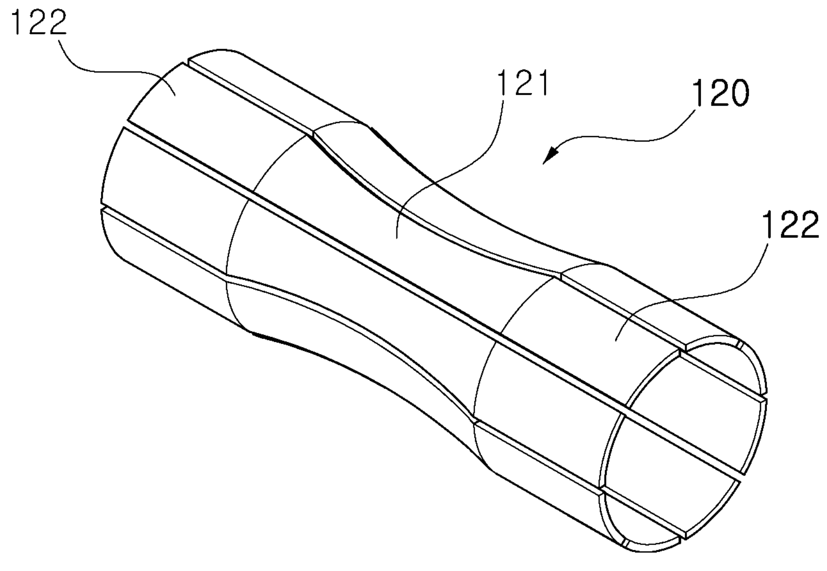
FIG. 4 is a view illustrating a stave that constitutes the flextensional low-frequency sound projector according to the present disclosure.

Furthermore, the stave 120 illustrated in FIG. 4 includes a flextensional bar 121 and a bending bar 122. A plurality of the flextensional bars 121 and a plurality of the bending bars 122, as illustrated, are arranged along a circumferential direction of the piezoelectric actuator 110 in such a manner as to surround an outer surface of the weighted object 112 of the piezoelectric actuator 110. A portion of inner surfaces of the plurality of the flextensional bar 121 and the bending bar 122 are brought into contact with an outer surface of the weighted object 110.

A plurality of staves 120 may be arranged to be spaced apart.

The flextensional bar 121 has a flat, concave, or convex shape, and both ends of are fixed to the weighted object 112.

Accordingly, the sound wave is radiated by the vibration in the lengthwise direction of the piezoelectric actuator 110 being converted into flextenional-mode vibration in the lateral direction and in the radial direction.

The flextensional bar 121 may be formed in such a manner that a lower surface thereof is rounded in a width direction thereof, so that the lower surface thereof corresponds to an outer surface of the piezoelectric stack 111. As illustrated in FIG. 2, the flextensional bar 121 may be formed in such a manner that an upper surface thereof is rounded in a lengthwise direction thereof, so that thicknesses of both ends of the flextensional low-frequency sound projector are greater than those of the center portion of the flextensional low-frequency sound projector. It is more desired that the flextensional bar 121 is concavely formed.

In a case where the flextensional bar 121 has the shape of a concave ellipse, when water pressure is applied, compression stress is applied to the piezoelectric actuator 110. Thus, the piezoelectric actuator 110 is driven in a manner that produces a high power operation.

An upper surface of the bending bar 122 is continuous with upper surfaces of both ends of the flextensional bar 121. A lower surface of one end portion of the bending bar 122 is fixed to a lateral surface of the weighted object 112 by being brought into contact therewith, and the other end portion thereof is formed in a manner that moves freely. Accordingly, the sound wave is radiated by the vibration in the lengthwise direction of the piezoelectric actuator 110 being converted into a bending-bar mode vibration in the lateral direction.

Resonance frequencies of the flextensional bar 121 and the bending bar 122 are determined by thicknesses and lengths thereof, respectively. An internal space 150 between the flextensional bar 121 and the piezoelectric actuator 110 may be filled with air.

The stave 120 may be formed of a material, such as iron, aluminum, tungsten, brass, or engineering plastic.

The baffles 130 in a pair may be configured in such a manner that one-side surfaces thereof are brought into contact with both ends, respectively, of the piezoelectric actuator 110, that is, with the weighted object 112 and that lateral surfaces thereof are brought into contact with inner surfaces, respectively, of the bending bars 122.

The baffle 130 may be formed of a polymer material, such as rubber, or urethane, or porous-composite, that has low impedance, in order to stabilize the vibration and the sound-wave radiation by the stave 120.

The acoustic window 140 has an inner surface whose shape corresponds to the shape of an outer surface of the stave 200 and thus may surround the stave 200. The acoustic window 140 surrounds the stave and serves to watertighten the inside of the flextensional low-frequency sound projector. In addition, the acoustic window 140 may be formed of a polymer material, such as rubber or urethane, in such a manner as to have the property of being acoustically transparent.

Figure 5:
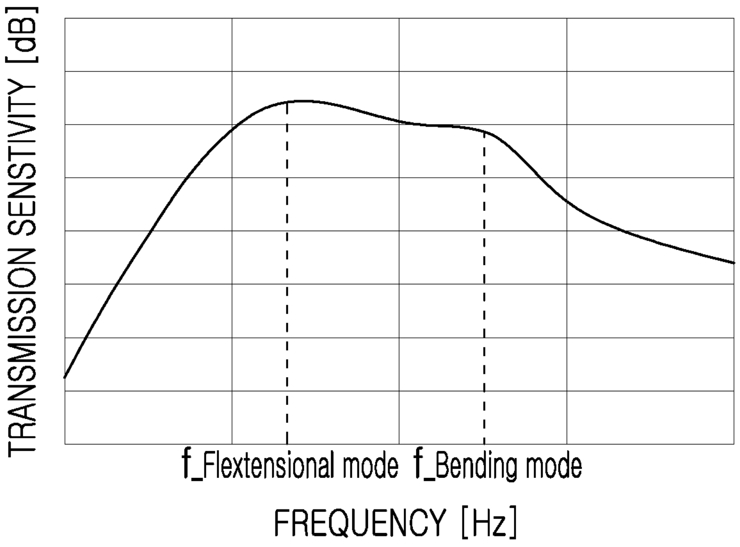
FIG. 5 is a graph showing a transmission sensitivity characteristic of the flextensional low-frequency sound projector according to the present disclosure.

FIG. 5 is a graph showing a transmission sensitivity characteristic of the flextensional low-frequency sound projector according to the present disclosure.

The vibration in the lengthwise direction that is generated in the piezoelectric actuator 110 is transferred to the stave 120 attached to piezoelectric actuator 110, and the transferred vibration is converted into the vibration in the lateral direction, thereby generating the sound wave.

A multiplicity of staves 120 are arranged in the circumferential direction of the piezoelectric actuator 110 and thus has the omni-directional characteristic of radiating the sound wave in all directions without directivity. From FIG. 5, it can be seen that the stave 120 is configured to have the flextensional bar 121 in the center and the bending bars 122 on both ends of the flextensional bar 121 and the stave 120 is driven in an independent vibration mode. The flextensional bar 121 and the bending bar 122 may be designed in such a manner that vibration modes thereof are determined by their respective thicknesses and lengths. When designing two vibration modes adjacently, as illustrated in FIG. 5, broadband transmission is possible.

The flextensional low-frequency sound projector according to the present disclosure is driven in two vibration modes, a vibration mode of the flextensional bar and a vibration mode of the bending bar, and thus is capable of performing low-frequency sound transmission at a broad frequency band.

The desired embodiment of the present disclosure is described above with reference to the accompanying drawings. However, the present disclosure is not limited to the desired embodiment. It would be apparent to a person of ordinary skill in the art that various modifications and alterations of the desired embodiment may possibly be made within the scope that does not depart from the nature and gist of the present disclosure. The resulting modification or alteration examples should fall within the scope of the claims of the present disclosure. The scope of the present disclosure should be defined by the claims.

DESCRIPTION OF REFERENCE NUMERALS

100: flextensional low-frequency sound projector
110: piezoelectric actuator
111: piezoelectric stack
112: weighted object
120: stave
121: flextensional bar
122: bending bar
130: baffle
140: acoustic window

What is claimed is:

1. A flextensional low-frequency sound projector comprising:

a piezoelectric actuator including a piezoelectric stack formed by stacking piezoelectric element and generating vibration in a lengthwise direction in response to an electrical signal that is input, and a pair of weighted objects that are brought into surface contact with both ends, respectively, of the piezoelectric stack; and a stave mounted on the piezoelectric actuator in such a manner as to encompass an outer surface of the piezoelectric actuator and generating the vibration in the lengthwise direction, which is generated by the piezoelectric actuator, as vibration in a lateral direction perpendicular to the outer surface of the piezoelectric actuator, wherein the stave activates two vibration modes that use different resonant frequencies.

2. The flextensional low-frequency sound projector of claim 1, wherein the stave comprises:

a flextensional bar mounted on the pair of weighted objects by being brought into contact with outer surfaces of the weighted objects; and bending bars being continuous with both ends, respectively, of the flextensional bar.

3. The flextensional low-frequency sound projector of claim 2, wherein a plurality of the flextensional bars are arranged to be spaced away along a circumference of the piezoelectric stack, and wherein a plurality of the bending bars are arranged to be spaced apart along the circumference of the piezoelectric actuator.

4. The flextensional low-frequency sound projector of claim 3, wherein the flextensional bar is shaped in a manner that is bent in a width direction thereof.

5. The flextensional low-frequency sound projector of claim 4, wherein an upper surface of the flextensional bar is shaped in a manner that is bent in a lengthwise direction thereof.

6. The flextensional low-frequency sound projector of claim 5, wherein the upper surface of the flextensional bar is concavely shaped.

7. The flextensional low-frequency sound projector of claim 5, wherein the upper surface of the flextensional bar is convexly shaped.

8. The flextensional low-frequency sound projector of claim 3, further comprising:

an insulating plate brought into surface contact with the weighted object and interposed between the piezoelectric stack and the weighted object.

9. The flextensional low-frequency sound projector of claim 1, wherein both ends of the flextensional bar are brought into contact with the weighted objects, respectively, that constitute one pair, and a lower surface of one end portion of the bending bar is brought into surface contact with a lateral surface of the weighted object.

10. The flextensional low-frequency sound projector of claim 9, further comprising:

a baffle configured in such a manner that one surface thereof is brought into contact with the weighted object and that a lateral surface thereof is brought into contact with an inner surface of the bending bar; and a sound window having an inner surface whose shape corresponds to the shape of an outer surface of the stave and surrounding the stave.

* * * * *